(No Model.)

J. O'FERRALL.
CAN SOLDERING MACHINE.

No. 384,464. Patented June 12, 1888.

Witnesses
Harry L. Amer
Ed. G. Austin

Inventor,
John O'Ferrall,
By his Attorney,
S. Brashears

UNITED STATES PATENT OFFICE.

JOHN O'FERRALL, OF BALTIMORE, MARYLAND.

CAN-SOLDERING MACHINE.

SPECIFICATION forming part of Letters Patent No. 384,464, dated June 12, 1888.

Application filed August 8, 1887. Serial No. 246,377. (No model.)

*To all whom it may concern:*

Be it known that I, JOHN O'FERRALL, a citizen of the United States, residing at Baltimore city, in the State of Maryland, have invented certain new and useful Improvements in Can-Soldering Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to machines for soldering the heads and bottoms upon tin cans and other cylindrical vessels, and the purpose thereof is to provide means whereby a more complete and perfect union of the parts may be effected than has heretofore been possible, and whereby, also, the seam or joint is rendered of equal strength in every part and of superior finish.

Figure 1:
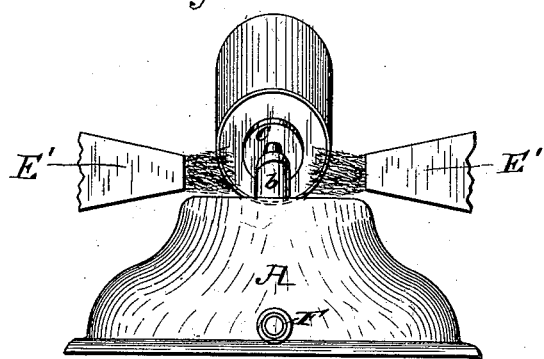
Figure 2:
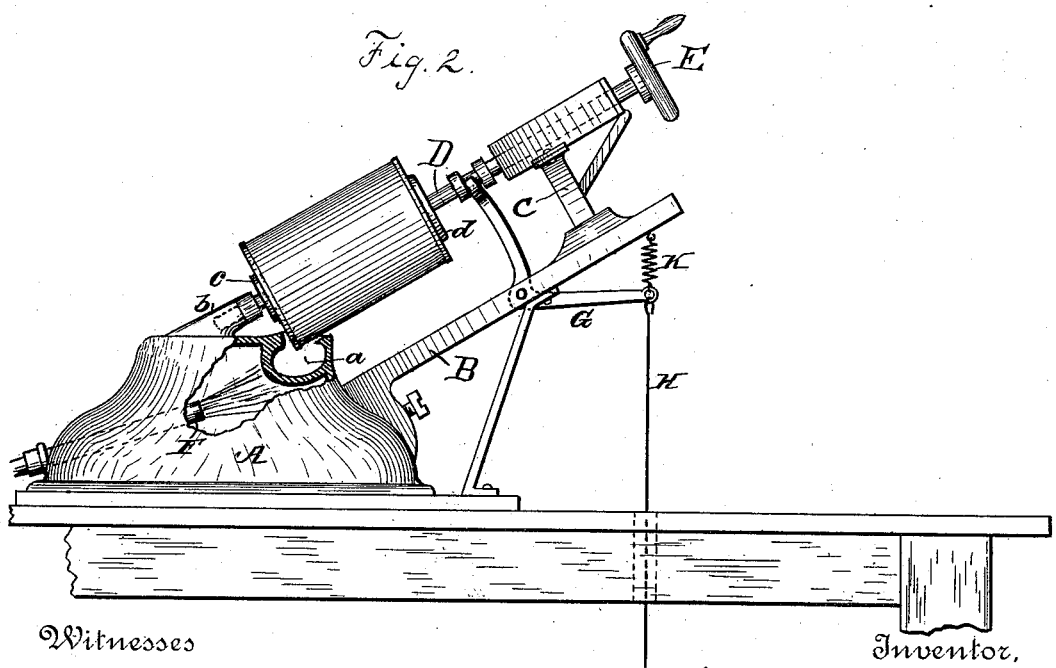

Referring to the drawings forming part of this application, Figure 1 is a front elevation showing one form of mechanism whereby my invention may be practiced. Fig. 2 is a side elevation, partly in section, showing the solder-bath and the devices for supporting and revolving the can.

In the said drawings the reference-letter A denotes the reservoir or heating-vessel, within which the melted solder employed is contained, a recess, $a$, being formed near one side to receive the angle of the inclined can and permit it to turn therein in contact with the melted solder.

B represents an inclined bracket having a support, C, within which is journaled a shaft, D, having a hand-wheel, E, by which the can may be revolved. The can is held by means of a clamping-disk, $d$, on the shaft D, and a clamping-disk, $c$, having a stem or spindle that is loosely supported in a socket, $b$, on the top of the reservoir. The shaft D is loosely engaged with a bell-crank lever, G, that is pivoted on the bracket B and connected with a treadle-rod, H, and with a spring, K, that is also attached to the bracket.

It will be seen that the spring K by drawing on one arm of the bell-crank causes its other arm to hold the shaft D and its clamping-disk $d$ in contact with the can head or bottom, as the case may be, and thus hold the can in contact with the clamping-disk $c$ at its other end. By drawing the horizontal arm of the lever G downward its other arm will move the shaft D longitudinally away from the can, and thereby release it when the soldering is completed. Within the reservoir or heating-chamber A is a gas-jet, F, by which the solder contained in the bath or groove $a$ is kept in a melted condition.

The device thus far described may be of any suitable construction and arrangement, whether new or old. The form shown in the drawings is preferable, however, being that now in general use.

Upon each side of the can, at points just above that where its angular edge enters and leaves the solder-bath, I locate blow-pipes or gas jets E' E', of any suitable construction, the arrangement being such that the two will operate simultaneously in the same or about the same plane, and in opposite directions, against the soldered joint of the can. It will thus be seen that the flames are directed against the angular edge and bottom of the can at or a little above the points where it enters and after it emerges from the liquid solder in the recess $a$.

As a result of this operation the solder is, in the language of the shop, "sweated in" throughout the entire joint or seam, completely inclosing the edges of the metal, filling the joint uniformly, materially increasing the strength and durability of the can, and adding greatly to the uniformity and beauty of finish.

I make no claim to the devices shown for supporting and rotating the can through the solder-bath, nor do I claim the method of connecting the can-body and can-bottom by passing the parts united and held in proper relative position through a bath of melted solder; but What I do claim, and desire to secure by Letters Patent of the United States, is—

1. In a can-soldering machine, the combination, with a solder-bath, of burners located on opposite sides of and above the point where the can-seam enters and emerges from the bath, whereby the solder is sweated into the seam from the outside, substantially as described.

2. The combination, with a reservoir having a solder-groove, $a$, of the burners E' E', located on opposite sides of and above the point where the head or bottom seam of a can is made to enter and emerge from said solder-groove, whereby the solder is sweated into the seam from the outside, substantially as described.

In testimony whereof I affix my signature in presence of two witnesses.

JOHN O'FERRALL.

Witnesses:
S. BRASHEARS,
W. J. BRASHEARS.